United States Patent
Henderson et al.

(10) Patent No.: US 8,539,224 B2
(45) Date of Patent: *Sep. 17, 2013

(54) OBSCURING FORM DATA THROUGH OBFUSCATION

(75) Inventors: Roderick C. Henderson, Apex, NC (US); John R. Hind, Raleigh, NC (US); Belinda Y. Langner, Cary, NC (US); Yongcheng Li, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 243 days.

This patent is subject to a terminal disclaimer.

(21) Appl. No.: 12/650,039

(22) Filed: Dec. 30, 2009

(65) Prior Publication Data

US 2011/0107077 A1    May 5, 2011

Related U.S. Application Data

(63) Continuation-in-part of application No. 12/613,231, filed on Nov. 5, 2009.

(51) Int. Cl.
    *H04L 29/06* (2006.01)
(52) U.S. Cl.
    USPC ............................................ 713/151; 726/26
(58) Field of Classification Search
    USPC .................... 713/150, 151; 726/26
    See application file for complete search history.

(56) References Cited

U.S. PATENT DOCUMENTS

| | | |
|---|---|---|
| 5,608,396 A | 3/1997 | Cheng et al. |
| 5,953,503 A | 9/1999 | Mitzenmacher et al. |
| 6,434,561 B1 | 8/2002 | Durst et al. |
| 6,643,815 B1 | 11/2003 | Davis et al. |
| 6,683,547 B2 | 1/2004 | Border et al. |
| 7,013,289 B2 | 3/2006 | Horn et al. |
| 7,102,552 B1 | 9/2006 | Archbold et al. |
| 7,307,552 B2 | 12/2007 | Ma et al. |
| 7,358,874 B2 | 4/2008 | Archbold et al. |
| 7,934,105 B1 | 4/2011 | Buckingham et al. |
| 8,341,501 B2 | 12/2012 | Franceschini et al. |

(Continued)

FOREIGN PATENT DOCUMENTS

CN         101192217         6/2008

OTHER PUBLICATIONS

Song, C. et al., "Information-Hiding URLs for Easier Website Evolution," paper appearing in 8th IEEE Intl. Symp. on Web Site Evolution, WSE '06, Sep. 23-24, 2006, pp. 95-102.

(Continued)

*Primary Examiner* — Jung Kim
*Assistant Examiner* — Ayoub Alata
(74) *Attorney, Agent, or Firm* — Marcia L. Doubet

(57) ABSTRACT

Obscuring form data to be passed in forms that are sent in messages over a communications network. The form data to be obscured is removed from a form and inserted as a portion of a Uniform Resource Location ("URL") string. The obscured form data may comprise hidden fields and/or links. An obfuscation is then applied to the portion of the URL string, thereby obscuring the information for sending on an outbound message. The original information is recovered from an inbound message which contains the obscured information by reversing the processing used for the obscuring. In one aspect, the obfuscation comprises encryption. In another aspect, the obfuscation comprises creating a tiny URL that replaces the portion of the URL string.

16 Claims, 7 Drawing Sheets

(56) References Cited

U.S. PATENT DOCUMENTS

| | | |
|---|---|---|
| 2003/0030575 A1 | 2/2003 | Frachtenberg et al. |
| 2003/0037232 A1 | 2/2003 | Bailiff |
| 2003/0097474 A1 | 5/2003 | Defosse et al. |
| 2004/0199762 A1* | 10/2004 | Carlson et al. ............... 713/153 |
| 2008/0267217 A1 | 10/2008 | Colville et al. |
| 2008/0307044 A1 | 12/2008 | Musson |
| 2011/0060997 A1* | 3/2011 | Scoda ........................ 715/738 |
| 2011/0107190 A1 | 5/2011 | Henderson, Jr. et al. |
| 2012/0167227 A1 | 6/2012 | Henderson, Jr. et al. |

OTHER PUBLICATIONS

Itokawa, Y. et al., "Dictionary-Based Compression Algorithms for Tree Structured Data," IMECS 2009, Mar. 18-20, 2009, vol. I and II, pp. 580-585.

Leyden, John, "Scotland's oldest newspaper exposes readers' smalls in public; URL manipulation snafu gives access to other users", posted in Security, Sep. 2, 2008, printed from http://www.theregister.co.uk/2008/09/02/scots_paper_privacy_snafu/ on Nov. 5, 2009.

Roderick C. Henderson et al., U.S. Appl. No. 12/613,231, filed Nov. 5, 2009, Office Action, Aug. 17, 2012, 28 pages.

Roderick C. Henderson et al., U.S. Appl. No. 12/613,231, filed Nov. 5, 2009, Office Action, Apr. 5, 2012, 15 pages.

Roderick C. Henderson et al., U.S. Appl. No. 13/411,592, filed Mar. 4, 2012, Office Action, Jul. 19, 2012, 25 pages.

Skibinski, et al., "Revisiting dictionary-based compression", published online in Wiley InterScience (www.interscience.wiley.com); DOI: 10.1002/spe.678; http://onlinelibrary.wiley.com/doi/10.1002/spe.678/pdf; Jul. 29, 2005; Software-Practice and Experience (SP&E) 2005; 35: pp. 1455-1476.

Roderick C. Henderson et al., U.S. Appl. No. 12/613,231, filed Nov. 5, 2009, Office Action, Oct. 26, 2012, 30 pages.

Roderick C. Henderson et al., U.S. Appl. No. 13/411,592, filed Mar. 4, 2012, Office Action, Oct. 25, 2012, 28 pages.

* cited by examiner

FIG. 2

```
200
    <html>
    <head>
    <title>Sample Page</title>
    </head>
    <body>
    <form name="newsitem" action="/news/submit.php" method="POST">    — 220
230   <input type="hidden" name="group_id" value="1005">
240   <input type="hidden" name="post_changes" value="yes">
      <input type="text" name="summary" value="" size="30" maxlength="60">
      <textarea name="details" rows="5" cols="50" wrap="soft"></textarea>
      <input type="submit" name="submit" value="Submit">
    </form>
    </body>
    </html>
                                                                              210
```

FIG. 5

500 http://myhost.com/apples/red/page.html

<form name="apples" action="stems/cutter.php?diameter=5" method=... </form>

FIG. 7

700 http://myhost.com/apples/red/stems/cutter.php?diameter=5

<form name="apples" action="/stems/cutter.php?diameter=5" method=... </form>

FIG. 9

900 http://myhost.com/stems/cutter.php?diameter=5

```
<form name="apples" action="stems/cutter.php?diameter=5" method=...
  <input type="hidden" name="color" value="yellow"/>
  <input type="hidden" name="variety" value="delicious"
  ...
</form>
```

FIG. 11

1100 http://myhost.com/apples/red/stems/cutter.php?diameter=5&color=yellow&variety=delicious

FIG. 12

1200 http://myhost.com/F12345678

FIG. 13

1300 http://inventive.service.com/F12345678

OBSCURING FORM DATA THROUGH OBFUSCATION

CROSS-REFERENCE TO RELATED APPLICATION

The present invention is a Continuation-in-Part of commonly-assigned and U.S. patent application Ser. No. 12/613,231, titled "OBSCURING INFORMATION IN MESSAGES USING COMPRESSION WITH SITE-SPECIFIC PREBUILT DICTIONARY", which was filed on Nov. 5, 2009 and which is incorporated herein by reference as if set forth fully.

BACKGROUND OF THE INVENTION

The present invention relates to computing environments, and deals more particularly with techniques for obscuring form data to be passed in forms that are sent in messages over a communications network.

Messages exchanged over a communications network such as the Internet commonly contain a Uniform Resource Location ("URL"). As is well known, a URL is a subset of a Uniform Resource Identifier ("URI") that specifies where a particular resource is located and a mechanism for retrieving it. The format of a URL is well known, and typically includes a host name and domain portion followed by a path name portion. A so-called "dynamic" form of URL is known, where the URL format provides for passing a string of one or more parameters, where each parameter comprises a name/value pair. The presence of the parameter string is denoted in the URL by specifying a question mark character, and the parameter string then follows this character. Within the parameter string, the name/value pairs are separated from one another by an ampersand character and an equal sign is used to separate the parameter name from the parameter value in each name/value pair.

There have been multiple cases of hacking web sites by modifying data from transmitted messages. In some cases, dynamic URL parameters were intercepted, allowing the hackers to discover private data, corrupt the back-end application, and/or corrupt the data used by the back-end application. In one known security breach, for example, a URL included a parameter name/value pair for specifying a user's key for registered users of a web site to thereby pass this key value to the back-end application. Hackers discovered that by modifying the user key value, they were able to view name and address information of the user associated with the altered key value.

BRIEF SUMMARY OF THE INVENTION

The present invention is directed to obscuring form data used in forms for messages that are to be exchanged over a communications network. The form data may comprise hidden form fields and/or links encoded in one or more forms contained in a markup language document. In one embodiment, obscuring the form data comprises: creating a parameter string from at least one hidden form field removed from a form to be transmitted on an outbound message; obscuring the parameter string; and appending the obscured parameter string to location information identifying an intended recipient for processing the outbound message, thereby creating an obscured version of the outbound message in which the at least one hidden form field is recoverable upon subsequently receiving an inbound message containing the obscured parameter string. When the form contains a link (e.g., a path segment of a URL), the parameter string is appended to the link (which is removed from the form); in this case, the obscuring obscures the link and the appended parameter string, creating an obscured string; the appending appends the obscured string to the location information, thereby creating the obscured version; and the link and the at least one hidden form field are recoverable upon subsequently receiving an inbound message containing the obscured string.

In one aspect, obscuring the parameter string comprises encrypting the parameter string, the at least one hidden form field being recoverable by decryption. Or, when the parameter string is appended to a link prior to the obscuring, then the link and parameter string are encrypted, the obscured information being recoverable by decryption. In another aspect, obscuring the parameter string comprises replacing the parameter string with a tiny URL, the at least one hidden form field being recoverable by using the tiny URL as a look-up key for a database in which the replaced parameter string is stored in association with the tiny URL. Or, when the parameter string is appended to a link prior to the obscuring, then the link and parameter string are replaced with a tiny URL, the obscured information being recoverable by using the tiny URL as a look-up key.

Embodiments of these and other aspects of the present invention may be provided as method, systems, and/or computer program products. It should be noted that the foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined by the appended claims, will become apparent in the non-limiting detailed description set forth below.

The present invention will be described with reference to the following drawings, in which like reference numbers denote the same element throughout.

BRIEF DESCRIPTION OF THE SEVERAL VIEWS OF THE DRAWINGS

FIG. 2 provides sample syntax of a Hypertext Markup Language ("HTML") page containing a form;

DETAILED DESCRIPTION OF THE INVENTION

Embodiments of the present invention are directed toward obscuring form data to be passed in forms that are sent in messages over a communications network. The form data to be obscured is embedded in forms encoded in a markup language document such as an HTML document used for displaying a Web page. The obscured form data may comprise hidden fields and/or links embedded in forms. The form data to be obscured is removed from a form and inserted into a URL. An obfuscation is then applied to a portion of the URL (as will be discussed in more detail below), thereby obscuring the information for sending on an outbound message. The original information is then recovered from an inbound message which contains the obscured information by reversing the processing used for the obscuring. In one aspect, the obfuscation comprises encryption of a portion of the URL. In another aspect, the obfuscation comprises replacing a portion of the URL with a tiny URL. The disclosed techniques may be implemented, for example, at a site's edge proxy or Web server, without disrupting operating of the Web application that uses the form data.

Security exposures may occur in the prior art when values of hidden fields from forms are exposed in a transmitted message. For example, if a form includes a hidden parameter such as an "account_id" attribute having a value of "123456", this provides information which could be used maliciously by a hacker. Security exposures may also occur when path name information is exposed on a transmitted URL. For example, if the path name is specified as "/root/user_accounts", this provides information about the directory structure on the target server which may be useful to a hacker who is attempting to gain access to the stored data. Embodiments of the present invention enable obscuring such information, as will now be described.

Figure 1:
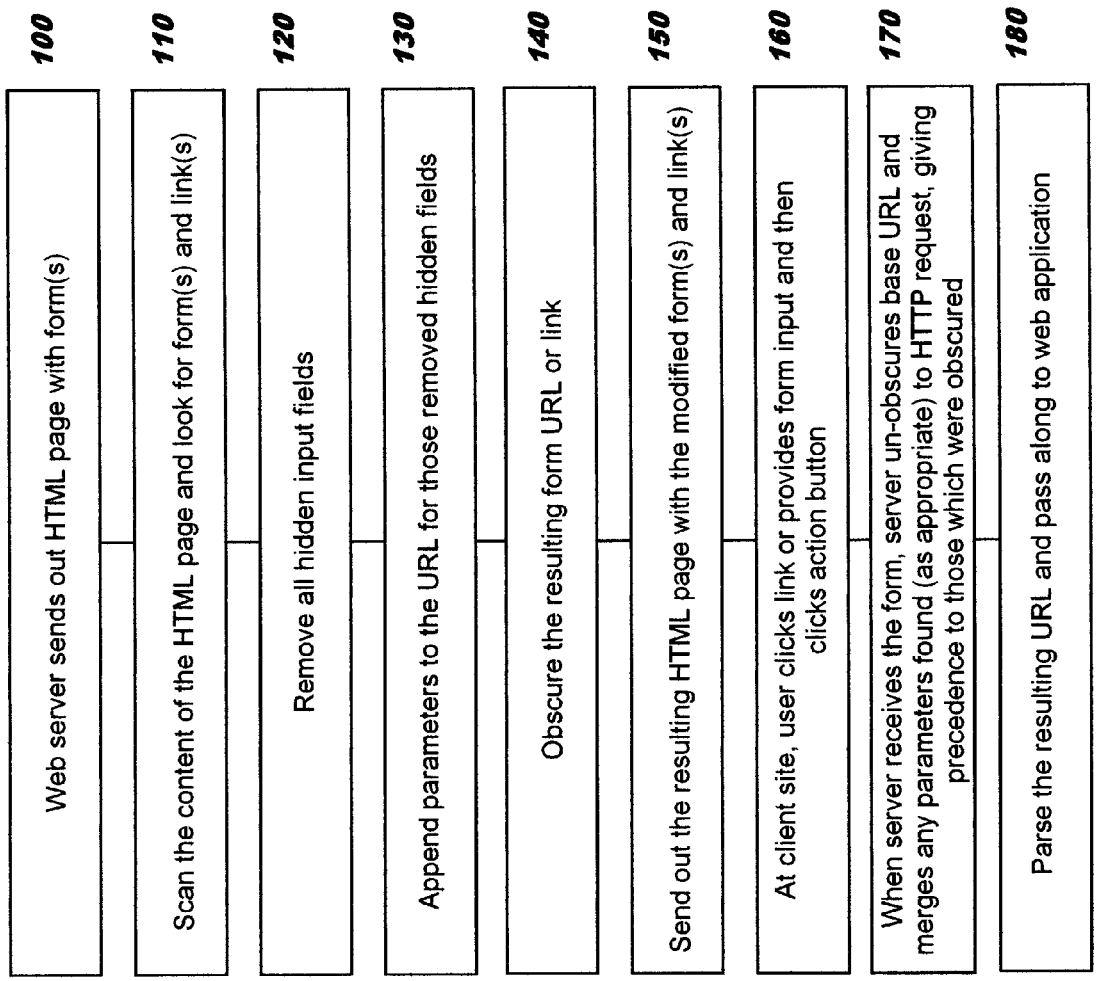
FIG. 1 provides a flowchart depicting logic which may be used for obscuring data from forms, according to the present invention.

FIG. 1 provides a flowchart depicting logic which may be used when obscuring data in forms, according to an embodiment of the present invention. A web server may have content to send out that includes an HTML page containing one or more forms (Block 100), where a form may contain parameters to be passed to a Web application. Forms may contain a number of form fields, including hidden fields. An embodiment of the present invention removes the hidden fields and adds them as a parameter string for an outbound URL, which is then obscured prior to sending to a client. Links specified in a web page are also removed and obscured prior to sending. Accordingly, the processing of FIG. 1 begins by scanning the content of the HTML page, looking for forms and links embedded therein (Block 110). A link or outbound URL may be encoded as the value of an "action" attribute of an HTML form. For example, see reference number 220 of the sample HTML page 200 in FIG. 2, where the value of the action attribute ("/news/submit.php", in this example) provides a relative URL that identifies the recipient to which form 210 will be sent for processing.

All hidden input fields are removed from the form (Block 120) and these removed hidden fields are then added as parameters to the embedded URL (Block 130), if any. In the sample HTML page 200, this comprises removing the hidden input fields 230, 240 and building a parameter string that includes parameter name/value pairs of "group_id=1005" (using the sample parameter name and value for hidden input field 230) and "post_changes="yes"" (using the sample parameter name and value for hidden input field 240), and appending that parameter string to the embedded URL 220.

Figures 3, 4:
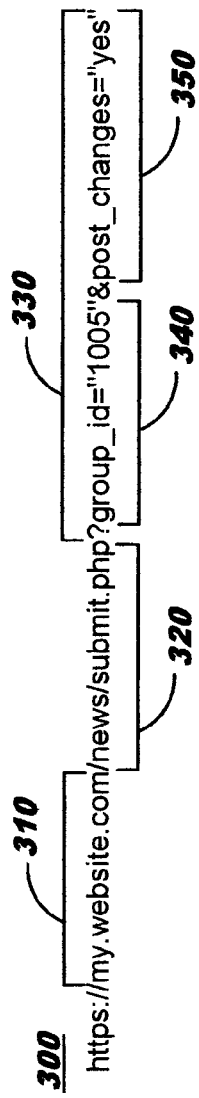
FIGS. 3 and 4 illustrate how form data is obscured, according to an aspect of the present invention, with additional illustrations provided in FIGS. 5-13.

FIG. 3 illustrates a sample URL 300 that results from appending the embedded URL 220 and a parameter string 330 created from removed input fields 230, 240 to a sample host name "my.website.com" 310. See reference number 320, where the removed link (i.e., the relative URL which was embedded in form 210 at 220) is shown, and reference numbers 340 and 350, where the parameter name/value pairs created for hidden input fields 230, 240 are shown. Note that if the form which was received at Block 100 does not include a link, then the processing at Block 130 comprises only building a parameter string, as illustrated at 330 in this example, and this parameter string preferably directly follows the host name 310 when creating a URL as illustrated at 300.

Returning to the discussion of FIG. 1, the resulting form URL or link created at Block 130 is then obscured (Block 140). The resulting HTML page with its modified form(s)/link(s) is then sent out to the target client (Block 150).

In one aspect of the present invention, the obscuring at Block 140 comprises using encryption on the URL with the parameters added at Block 130. (Encryption techniques are well known to those of ordinary skill in the art, and a detailed description thereof is not deemed necessary to an understanding of the inventive concepts disclosed herein.)

In another aspect of the present invention, the obscuring at Block 140 comprises using a so-called "tiny URL" for the URL with the parameters added at Block 130. The term "tiny URL" is known in the art, and signifies a reference to a database element where the original URL is stored. When the tiny URL is received back at the sender on a corresponding inbound message, it is used as a look-up key to this database to retrieve the original URL. The original URL is then substituted for the tiny URL for processing the inbound message at the message receiver. (Because it remains possible to hack the tiny URL, a checksum may be included in the tiny URL on the outbound message to enable validating whether the correct original URL is retrieved from the database for processing the inbound message.) The present inventors are not aware of any attempts to apply the tiny URL technique to hidden form data.

FIG. 4 illustrates a sample form 400 resulting from the processing of Block 140 when using a tiny URL for obfuscation. The sample form 410 is a modified version of form 210 from FIG. 2. In this example, the modifications comprise replacing the value 220 of the "action" parameter with a tiny URL 420 created to replace the path portion 320 and parameter portion 330 of URL 300 from FIG. 3, and omitting both of the form fields 230, 240 that specified hidden input fields (such that form 410 contains 3 child elements, whereas the original form 210 contains 5 child elements). Note that the value "F24585382" within the tiny URL at 420 is provided as an example for illustrating an actual look-up key, and is not intended to represent an actual tiny URL.

In an aspect where encryption is used for obfuscation, the value 420 of the action parameter is replaced by a URL containing an encrypted path and parameter string. Accordingly, the value "F24585382" may be replaced by a string created by encryption (not illustrated).

According to preferred embodiments, the portion of the URL which is obscured at Block 140 depends on whether the URL is targeting a location being serviced by the proxy, load balancer, or Web server which will receive the message containing the obscured URL. Suppose that the format of a URL is represented as follows:

<protocol>://<host_port_options>/<path>?<parameters>

If the <host_port_options> portion of the URL targets a location being serviced by the recipient of the message containing the obscured URL, then the obfuscation performed at Block 140 comprises obscuring the <path>?<parameters> portion of the URL. Otherwise, the obfuscation performed at Block 140 comprises obscuring the entirety of the <host_port_options>/<path>?<parameters>, and inserting a new <host_port_options> into the URL which will point to the location that services the message containing the obscured URL.

For example, suppose the Web page on which the form will be displayed is addressed by the URL 500 shown in FIG. 5. Embodiments of the present invention normalize the <path> portion of the URL to the <host_port_options> portion thereof when a relative URL is used. Thus, if the form action (i.e., the value of the action attribute on the <form> element) is relative to the displayed page, as illustrated by the sample <form> element 600 of FIG. 6, then the URL being obscured is as shown at 700 in FIG. 7. On the other hand, if the form action is relative to <protocol>://<host_port_options>, as illustrated by the sample <form> element 800 of FIG. 8, then the URL being obscured is as shown at 900 in FIG. 9.

It may happen that the original form action already has parameters. In this case, an embodiment of the present invention adds the parameters created from removed hidden fields to this parameter list before obfuscation. See, for example, the sample parameter name/value pair "diameter=5" in the form actions in FIGS. 6 and 8. Suppose that the form includes 2 hidden fields, as illustrated in the sample <form> element 1000 of FIG. 10. The URL to be obscured is shown, in this example, at 1100 in FIG. 11. Assuming "myhost.com" is being serviced by an embodiment of the present invention, then the obscured URL resulting from use of a tiny URL is as illustrated at 1200 in FIG. 12, where the <path> and <parameter> portion has been replaced. On the other hand, if "myhost.com" is not serviced by an embodiment of the present invention, then the obscured URL resulting from use of a tiny URL is as illustrated at 1300 in FIG. 13, where the <host_port_options> is also included within the URL portion which is represented by the tiny URL.

Returning again to the discussion of FIG. 1, the client receiving the HTML page with an embedded form uses the form as a template for the user to provide input data for the form fields, after which the user submits the form by clicking on an action button; or, alternatively, the user may submit the form by clicking on a rewritten link created to represent the form data (Block 160). Notably, because the hidden input fields which were removed at Block 120 would not have been displayed at the client, due to the "hidden" value for the type attribute (see the 'type="hidden"' attribute of the example input fields 230, 240 of FIG. 2), the user will not perceive any difference in the form by the removal of those hidden fields. Once the user completes the entry of data for the form fields and submits the form by clicking on the action button or clicking a rewritten link, it is received at a Web server or edge proxy (Block 170), which recovers the values from the obscured URL. When the obfuscation comprises encryption, then the recovery comprises decryption, as will be understood by those of ordinary skill in the art. When the obfuscation comprises replacement with a tiny URL, then the recovery comprises obtaining the original reformed URL by using the tiny URL as a look-up key for a database, as was discussed earlier.

Because parameters may have been added to the original URL for representing hidden input fields, as discussed above with reference to Block 130, the recovery performed at Block 170 may result in finding new parameters for a form. If the original inbound request sent from the client was a GET request and the URL from the action element contained parameters (which has not been illustrated in FIG. 2), then these parameters are merged with any parameters that were recovered by decryption or tiny URL look-up, and the result is passed along in the URL to the Web application (Block 180). In this manner, the hidden parameters are restored in GET action HTML forms. Or, if the original inbound request sent from the client was a PUT request and the request contained a parameter data segment, then if the parameters were encrypted with the URL or were present in a URL for which a tiny URL replacement was provided, they are removed from the URL and merged with the segment data before being passed upstream to the server or application for which the parameter data segment is intended (Block 180). In this manner, the hidden parameter data segments are restored on PUT action HTML forms.

Note that the processing of Block 170 preferably overrides any similarly-named data (e.g., parameters having a name identical to that of a recovered parameter name, or a hidden form field having an attribute name identical to a recovered parameter name) before passing the data to a Web application at Block 180. This overriding gives precedence to the parameters which were obscured, and serves to prevent a hacker from providing malicious input values on a message sent to the Web server or edge proxy.

Using obfuscation for form data as disclosed herein, path name and parameters are not transmitted in the clear, thereby improving security. When using tiny URLs for obfuscation, the URL with its removed link(s) and/or parameter string created from removed hidden field(s) is not transmitted to the client, which eliminates a hacker's opportunity to manipulate a message which is in transmission between the client and server or edge proxy.

Alternative embodiments may provide obfuscation at locations different from those which have been discussed. For example, the obfuscation might be provided in a load balancer, Web proxy, Web server, or edge server.

Figure 14:
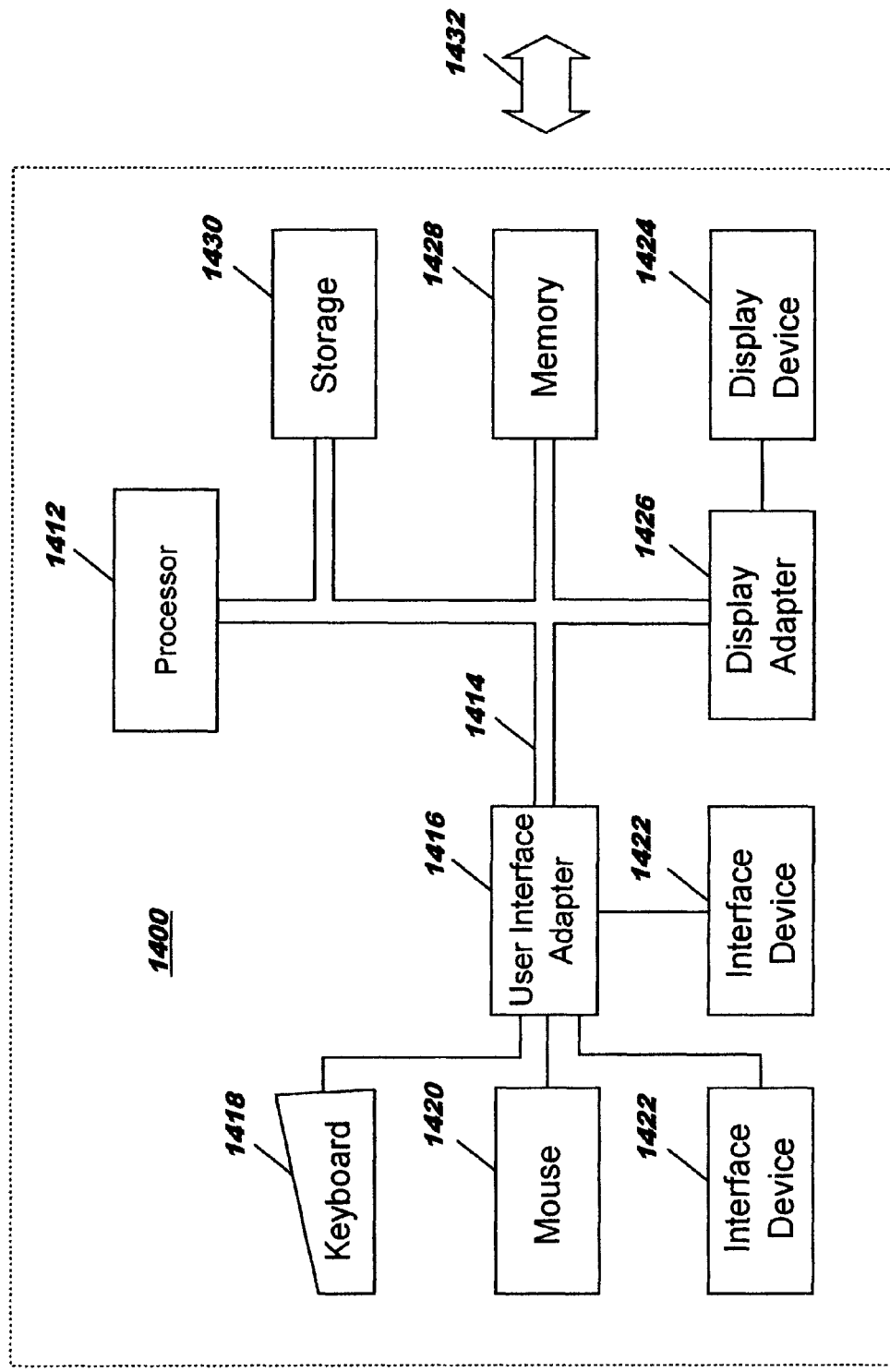
FIG. 14 depicts a data processing system suitable for storing and/or executing program code.

Referring now to FIG. 14, a data processing system 1400 suitable for storing and/or executing program code includes at least one processor 1412 coupled directly or indirectly to memory elements through a system bus 1414. The memory elements can include local memory 1428 employed during actual execution of the program code, bulk storage 1430, and cache memories (not shown) which provide temporary storage of at least some program code in order to reduce the number of times code must be retrieved from bulk storage during execution.

Input/output ("I/O") devices (including but not limited to keyboards 1418, displays 1424, pointing devices 1420, other interface devices 1422, etc.) can be coupled to the system either directly or through intervening I/O controllers or adapters (1416, 1426).

Network adapters may also be coupled to the system to enable the data processing system to become coupled to other data processing systems or remote printers or storage devices through intervening private or public networks (as shown generally at 1432). Modems, cable modem attachments, wireless adapters, and Ethernet cards are just a few of the currently-available types of network adapters.

Figure 15:
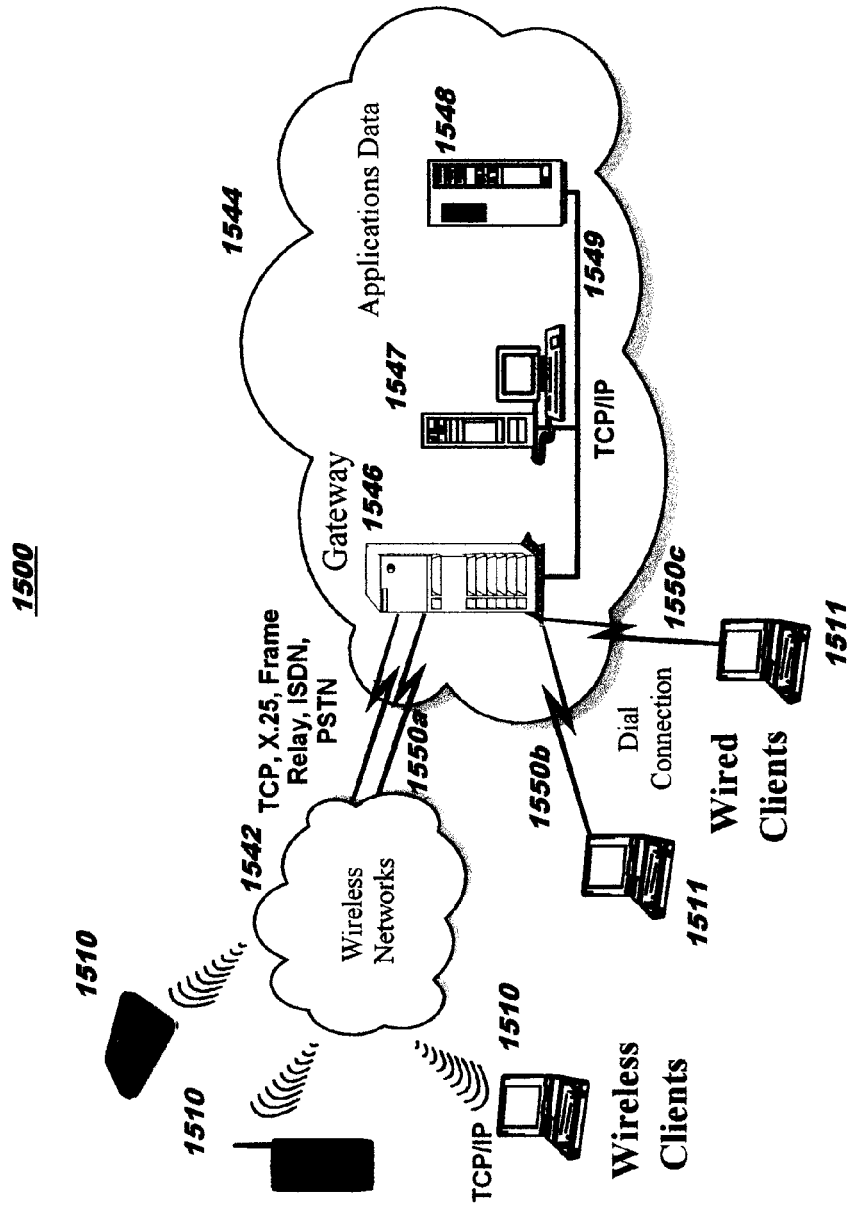
FIG. 15 depicts a representative networking environment in which one or more embodiments of the present invention may be used.

FIG. 15 illustrates a data processing network environment 1500 in which the present invention may be practiced. The data processing network 1500 may include a plurality of individual networks, such as wireless network 1542 and wired network 1544. A plurality of wireless devices 1510 may communicate over wireless network 1542, and a plurality of wired devices, shown in the figure (by way of illustration) as workstations 1511, may communicate over network 1544. Additionally, as those skilled in the art will appreciate, one or more local area networks ("LANs") may be included (not shown), where a LAN may comprise a plurality of devices coupled to a host processor.

Still referring to FIG. 15, the networks 1542 and 1544 may also include mainframe computers or servers, such as a gateway computer 1546 or application server 1547 (which may access a data repository 1548). A gateway computer 1546 serves as a point of entry into each network, such as network 1544. The gateway 1546 may be preferably coupled to another network 1542 by means of a communications link 1550*a*. The gateway 1546 may also be directly coupled to one or more devices 1511 using a communications link 1550*b*, 1550*c*, and/or may be indirectly coupled to such devices. The gateway computer 1546 may be implemented utilizing an Enterprise Systems Architecture/390® computer available from IBM. Depending on the application, a midrange computer, such as an Application System/400® (also known as an AS/400®), iSeries®, System i™, and so forth may be employed. ("Enterprise Systems Architecture/390", "Application System/400", "AS/400", and "iSeries" are registered trademarks of IBM in the United States, other countries, or both, and "System i" is a trademark of IBM.)

The gateway computer 1546 may also be coupled 1549 to a storage device (such as data repository 1548).

Those skilled in the art will appreciate that the gateway computer 1546 may be located a great geographic distance from the network 1542, and similarly, the devices 1510a, 1511a and/or other devices 1510b, 1511b may be located some distance from the networks 1542 and 1544, respectively. For example, the network 1542 may be located in California, while the gateway 1546 may be located in Texas, and one or more of the devices 1510a may be located in Florida. The devices 1510a may connect to the wireless network 1542 using a networking protocol such as the Transmission Control Protocol/Internet Protocol ("TCP/IP") over a number of alternative connection media, such as cellular phone, radio frequency networks, satellite networks, etc. The wireless network 1542 preferably connects to the gateway 1546 using a network connection 1550a such as TCP or User Datagram Protocol ("UDP") over IP, X.25, Frame Relay, Integrated Services Digital Network ("ISDN"), Public Switched Telephone Network ("PSTN"), etc. The devices 1511a may connect directly to the gateway 1546 using dial connections 1550b or 1550c. Further, the wireless network 1542 and network 1544 may connect to one or more other networks (not shown), in an analogous manner to that depicted in FIG. 15.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module", or "system". Furthermore, aspects of the present invention may take the form of a computer program product embodied in one or more computer readable media having computer readable program code embodied thereon.

Any combination of one or more computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory ("RAM"), a read-only memory ("ROM"), an erasable programmable read-only memory ("EPROM" or flash memory), a portable compact disc read-only memory ("CD-ROM"), DVD, an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency, etc., or any suitable combination of the foregoing.

Computer program code for carrying out operations for aspects of the present invention may be written in any combination of one or more programming languages, including an object oriented programming language such as Java, Smalltalk, C++, or the like, and conventional procedural programming languages such as the "C" programming language or similar programming languages. The program code may execute as a stand-alone software package, and may execute partly on the user's device and partly on a remote computer. The remote computer may be connected to the user's device through any type of network, including a local area network ("LAN"), a wide area network ("WAN"), or through the Internet using an Internet Service Provider.

Aspects of the present invention are described above with reference to flow diagrams and/or block diagrams of methods, apparatus (systems), and computer program products according to embodiments of the invention. It will be understood that each flow or block of the flow diagrams and/or block diagrams, and combinations of flows or blocks in the flow diagrams and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flow diagram flow or flows and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flow diagram flow or flows and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flow diagram flow or flows and/or block diagram block or blocks.

Flow diagrams and/or block diagrams presented in the figures herein illustrate the architecture, functionality, and operation of possible implementations of systems, methods, and computer program products according to various embodiments of the present invention. In this regard, each flow or block in the flow diagrams or block diagrams may represent a module, segment, or portion of code, which comprises one or more executable instructions for implementing the specified logical function(s). It should also be noted that, in some alternative implementations, the functions noted in the flows and/or blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or each flow of the flow diagrams, and combinations of blocks in the block diagrams and/or flows in the flow diagrams, may be implemented by special purpose hardware-based systems that perform the specified functions or acts, or combinations of special purpose hardware and computer instructions.

While embodiments of the present invention have been described, additional variations and modifications in those embodiments may occur to those skilled in the art once they learn of the basic inventive concepts. Therefore, it is intended that the appended claims shall be construed to include the described embodiments and all such variations and modifications as fall within the spirit and scope of the invention.

The invention claimed is:

1. A method for obscuring form data in forms embedded in web pages to be transmitted in outbound messages, comprising using a processor of a computer for:
    searching content of a web page to locate a form embedded therein;
    responsive to locating the embedded form, obscuring form data of the embedded form, comprising:
    removing, from the embedded form, each of at least one hidden form field embedded therein;
    creating a parameter string from the each of at least one removed hidden form field;
    appending the created parameter string to location information for the embedded form, thereby creating a parameterized version of the location information, the location information comprising content of an action link embedded in the embedded form and specifying an intended recipient for processing the content of the web page;
    obscuring a portion of the parameterized version of the location information, thereby creating an obscured version of the parameterized version in which the at least one removed hidden form field is recoverable upon subsequently receiving the web page in an inbound message; and
    replacing the content of the action link with the obscured version of the parameterized version; and
    transmitting the web page in an outbound message.

2. The method according to claim 1, wherein obscuring the portion comprises encrypting the portion, the at least one removed hidden form field being recoverable by decryption.

3. The method according to claim 1, wherein obscuring the portion comprises replacing the portion with a tiny Uniform Resource Locator ("URL"), the at least one removed hidden form field being recoverable by using the tiny URL as a look-up key for a database in which the replaced portion is stored in association with the tiny URL.

4. The method according to claim 1, wherein the form is encoded in a markup language document.

5. The method according to claim 1, further comprising recovering the each of at least one removed hidden form field upon subsequently receiving the transmitted web page in the inbound message.

6. The method according to claim 1, wherein the location information comprises a path segment of a Uniform Resource Locator.

7. A system for obscuring form data in forms embedded in web pages to be transmitted in outbound messages, comprising:
    a computer comprising a processor; and
    instructions which are executable, using the processor, to implement functions comprising:
    searching content of a web page to locate a form embedded therein;
    responsive to locating the embedded form, obscuring form data of the embedded form, comprising:
    removing, from the embedded form, each of at least one hidden form field embedded therein;
    creating a parameter string from the each of at least one removed hidden form field;
    appending the created parameter string to location information for the embedded form, thereby creating a parameterized version of the location information, the location information comprising content of an action link embedded in the embedded form and specifying an intended recipient for processing the content of the web page;
    obscuring a portion of the parameterized version of the location information, thereby creating an obscured version of the parameterized version in which the at least one removed hidden form field is recoverable upon subsequently receiving the web page in an inbound message; and
    replacing the content of the action link with the obscured version of the parameterized version; and
    transmitting the web page in an outbound message.

8. The system according to claim 7, wherein obscuring the portion comprises encrypting the portion, the at least one removed hidden form field being recoverable by decryption.

9. The system according to claim 7, wherein obscuring the portion comprises replacing the portion with a tiny Uniform Resource Locator ("URL"), the at least one removed hidden form field being recoverable by using the tiny URL as a look-up key for a database in which the replaced portion is stored in association with the tiny URL.

10. The system according to claim 7, wherein the functions further comprise recovering the each of at least one removed hidden form field upon subsequently receiving the transmitted web page in the inbound message.

11. The system according to claim 7, wherein the location information comprises a path segment of a Uniform Resource Locator.

12. A computer program product for obscuring form data in forms embedded in web pages to be transmitted in outbound messages, the computer program product comprising:
    a non-transitory computer readable storage medium having computer readable program code embodied therein, the computer readable program code configured for:
    searching content of a web page to locate a form embedded therein;
    responsive to locating the embedded form, obscuring form data of the embedded form, comprising:
    removing, from the embedded form, each of at least one hidden form field embedded therein;
    creating a parameter string from the each of at least one removed hidden form field;
    appending the created parameter string to location information for the embedded form, thereby creating a parameterized version of the location information, the location information comprising content of an action link embedded in the embedded form and specifying an intended recipient for processing the content of the web page;

obscuring a portion of the parameterized version of the location information, thereby creating an obscured version of the parameterized version in which the at least one removed hidden form field is recoverable upon subsequently receiving the web page in an inbound message; and replacing the content of the action link with the obscured version of the parameterized version; and transmitting the web page in an outbound message.

13. The computer program product according to claim 12, wherein obscuring the portion comprises encrypting the portion, the at least one removed hidden form field being recoverable by decryption.

14. The computer program product according to claim 12, wherein obscuring the portion comprises replacing the portion with a tiny Uniform Resource Locator ("URL"), the at least one removed hidden form field being recoverable by using the tiny URL as a look-up key for a database in which the replaced portion is stored in association with the tiny URL.

15. The computer program product according to claim 12, wherein the computer readable program code is further configured for recovering the each of at least one removed hidden form field upon subsequently receiving the transmitted web page in the inbound message.

16. The computer program product according to claim 15, wherein the location information comprises a path segment of a Uniform Resource Locator.

\* \* \* \* \*